United States Patent [19]

Hays

[11] Patent Number: 4,951,793

[45] Date of Patent: Aug. 28, 1990

[54] CLUTCH ASSEMBLY WITH IMPROVED DUAL FRICTIONAL FACINGS

[76] Inventor: Bill J. Hays, 10582 Palladium Ave., Garden Grove, Calif. 92640

[21] Appl. No.: 301,439

[22] Filed: Jan. 25, 1989

[51] Int. Cl.⁵ .............................................. F16D 13/60
[52] U.S. Cl. .............................. 192/70.27; 192/107 M
[58] Field of Search ............ 192/70.27, 107 M, 107 R

[56] References Cited

U.S. PATENT DOCUMENTS

| | | | |
|---|---|---|---|
| 2,163,884 | 6/1939 | La Brie | 192/107 M |
| 4,202,432 | 5/1980 | Komori | 192/107 M |
| 4,270,640 | 6/1981 | Davies | 192/107 R |
| 4,593,801 | 6/1986 | Takeuchi et al. | 192/107 R |
| 4,615,427 | 10/1986 | Majima | 192/107 M |
| 4,727,972 | 3/1988 | Mueller | 192/107 M |
| 4,741,424 | 5/1988 | Kitano et al. | 192/107 M |
| 4,830,164 | 5/1989 | Hays | 192/107 M |

*Primary Examiner*—Leslie A. Braun
*Assistant Examiner*—Nicholas Whitelaw
*Attorney, Agent, or Firm*—Plante, Strauss, Vanderburgh & Connors

[57] ABSTRACT

There is disclosed an automotive clutch in which frictional engagement faces of a clutch are provided with an organic composite facing and a sintered metal facing. By this combination, the benefits of both types of facings are obtained without any of the disadvantages that formerly plagued the use of these facings. In the invention, the organic composite facing provides the low temperature service for the clutch with a suitably high coefficient of friction which is relatively constant from ambient to several hundred degrees F. The sintered metal facing provides high temperature service for the clutch. Thus, when the organic composite facings reach their maximum service temperature of around 500 degrees F., the sintered metal facings provide their optimum coefficient of friction, resulting in a subassembly in which the overall or average coefficient of friction remains substantially constant from ambient temperatures to the maximum service temperature of the sintered metal coatings, in excess of 900–1800 degrees F. The result, when incorporated in an automotive clutch, is a clutch having a very smooth, non-vibrational action which does not exhibit premature wear and failure.

9 Claims, 2 Drawing Sheets

CLUTCH ASSEMBLY WITH IMPROVED DUAL FRICTIONAL FACINGS

BACKGROUND OF THE INVENTION

1. Field of Invention

This invention relates to improvements in autmotive clutches and, in particular, to a clutch with improved frictional facings.

2. Brief Statement of the Prior Art

In most automotive and truck vehicles, torque is transmitted to the drive shaft through a clutch disc which is mounted on the transmission input shaft and which is received between a pressure plate of the clutch and the flywheel. Resilient springs, either coil springs or a Bellville spring, apply a resilient force to the pressure plate to bias it towards the flywheel, frictionally securing the clutch disc between the pressure plate and the flywheel, and a lever mechanism is provided to release the spring force and retract the pressure plate to disengage the clutch.

Asbestos facings have been used for many years and have served suitably as frictional facings on the surfaces of the clutch disc. These facings however, have fallen into disfavor because of the health hazard presented by asbestos, and recent attention has forcused on alternative materials. Of these alternative facings, the most commonly used have been organic, and/or composite, facings. The composite facings are formed of carbon or various resins which are reinforced with non-toxic fibrous materials, and are commonly referred to as organic composites, although in some instances they are formed of carbon rather than organic materials. As used hereinafter, these will be referred to as organic composite facings and this term is intended to include all carbon and organic facings.

A difficulty with the organic composite facings is that they are entirely unsuited for use at high temperatures. The coefficient of friction of the organic composite materials declines dramatically at elevated temperatures, typically at temperatures in excess of 500 degree F. These temperatures can be quickly achieved on the surfaces of the frictional facings of a clutch, particularly if there is an excessive amount of sliding movement of the members during clutch engagement. This results in an accelerated failure since as the temperature increases, the coefficient of friction decreases, causing more slippage and frictional rubbing of the surfaces, which further increases the temperature, resulting in premature wear and destruction of the surface. Often the organic composite facings are damaged by a permanent surface glazing, which results from overheating of the clutch. When this occurs, the facing looses its original frictional properties and significantly deteriorates in performance.

In severe, high usage commercial applications, sintered metal facings are commonly used. These sintered metal facings are frequently provided as a friction facing in the form of a disc, or individual pucks, which are generally trapezoidal shaped members that are bonded or secured with fasteners to the surfaces of the clutch disc, pressure plate, or flywheel. The sintered metal facings have very low coefficients of friction at low and ambient temperatures. At temperatures in excess of several hundred degrees F., however, the sintered metal facings exhibit very acceptable coefficients of friction.

Attempts have been made to adapt the sintered metal facings to clutch members for normal automotive applications, however, these attempts have not been successful, primarily because of their abrupt, uncontrollable characteristics and because they are two to three times as heavy as organic composite facings. Their greater weight creates excess inertia loading resulting in excess wear of transmission components. In fact, one noted automotive authority, Mr. Thomas Monroe, has written that sintered metal facings are entirely unsuited for normal automotive use and will never be used in normal applications, *Clutch and Flywheel Handbook* p 66 (1987). The greater weight of sintered metal facings and their low coefficient of friction values at normal operating temperatures results in vibration, slipping, chattering and premature wear of the clutch.

OBJECTIVES OF THE INVENTION

It is an ovjective of this invention to provide an improved frictional plate subassembly.

It is further an object of this invention to provide a frictional plate assembly with extended low and high temperature frictional characteristics which are substantially constant throughout the complete temperature range.

It is also an object of this invention to provide a frictional plate assembly which is free of all objectionable environmental and health concerns.

It is also an object of this invention to provide a frictional plate assembly which provides for smooth efficient clutch operation and superior engagement control by the operator.

It is a further object of this invention to provide the aforementioned frictional plate subassembly for use in a clutch of an automobile, truck or similar vehicle.

It is also an object of this invention to provide an improved automotive clutch which is highly suitable for severe and heavy use, such as experienced by commercial and competitive vehicles.

It is also an object of this invention to provide a clutch with superior frictional characteristics which can successfully operate with reduced frictional surface area, resulting in smaller clutch assemblies and components.

It is also an object of this invention to provide a clutch which will operate efficiently using less total clamping pressure, thereby providing longer engine and bearing life, reduced clutch component wear, and less operator fatigue.

It is also an object of this invention to provide a clutch which will operate at lower temperatures than present clutches, thereby reducing clutch component damage or failure.

It is also an object of this invention to provide a clutch which can utilize some organic composite facings such as the very lightweight "carbon-carbon" materials which reduces disc inertia, thereby facilitating disc release and providing easier transmission shifting and increased transmission component life.

BRIEF DESCRIPTION OF THE INVENTION

This invention comprises the combination of organic composite organic facings and sintered metal facings in a single frictional assembly. It is specifically applied to an automotive clutch in which frictional engagement faces of a clutch are provided with an organic composite facing and a sintered metal facing. By this combination, the benefits of both types of facings are obtained without any of the disadvantages that formerly plagued the use of these facings. In the invention, the organic composite facing provides the low temperature service for the clutch with a suitably high coefficient of friction which is relatively constant from ambient to several hundred degrees F. The sintered metal facings provide high temperature service for the subassembly. Thus, when the organic composite facings reach their maximum service temperature of around 500 degrees F., the sintered metal facings provide their optimum coefficient of friction, resulting in a subassembly in which the overall or average coefficient of friction remains substantially constant from ambient temperatures to the maximum service temperature of the sintered metal coatings of 900–1800 degrees F. The result, when incorporated in an automotive clutch, is a clutch having a very smooth, non-vibrational action which does not exhibit premature wear and failure.

BRIEF DESCRIPTION OF THE DRAWINGS

The invention will be discribed with reference to the Figures of which.

DESCRIPTION OF PREFERRED EMBODIMENT

Figure 1:
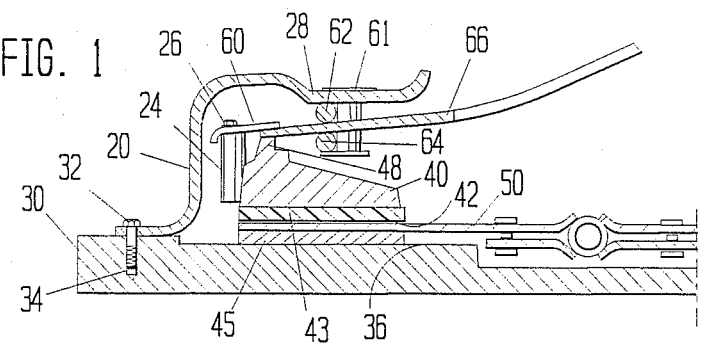
FIG. 1 is an elevational sectional view of a typical automotive clutch which utilizes the frictional facings of this invention.

Referring now to FIG. 1, a conventional clutch cover and flywheel assembly is illustrated in cross sectional view. The particular assembly which is illustrated has a diaphragm pressure plate, however, the invention is equally applicable to other pressure plate designs such as those using levers and compression coil springs, rather than the illustrated diaphragm.

The clutch cover 20 is secured to the flywheel 30 by a plurality of screw fasteners 32 which are received in internally threaded bores 34 in the flywheel. The pressure plate 40 has a flat undersurface 42 which engages the clutch disc 50 and applies pressure thereto, frictionally securing the disc 50 between the engaging surface 42 of the pressure plate and the engaging surface 36 of the flywheel. The opposed, frictional bearing surfaces are covered with a frictional material. In this invention, and organic composite facing 43 is provided between the pressure plate and the clutch disc 50, and a sintered metal facing 45 is provided between the flywheel and the clutch disc 50.

A plurality of bosses 24 are peripherally disposed about the cover 20 and receive machine bolts 26 which maintain retractor clips 60 in the assembly. Cover 20 has a generally flat annular land 28 which has a plurality of spaced apart apertures that receive fasteners such as rivets 61 which retain the upper pivot ring 62 and the lower pivot ring 64 for the Bellville diaphragm 66. The peripheral edge of the Bellville diaphragm 66 engages the upstanding edge 48 on the upper face of the pressure plate 40.

The pressure plate 40 is secured in the assembly by drive straps (not shown) which extend between the underside of the cover 20 and the pressure plate 40, thereby rotationally interlocking these members, while permitting relative axial movement. The retractor clips 60 are spaced equally about the periphery of the pressure ring on the upper ends of bosses 24 and the inside ends of the clips hook over the top of the Bellville diaphragm 66, interlocking the peripheral edge of the diaphragm to the pressure ring so that an upward flexing of this peripheral edge (which occurs when the diaphragm is compressed) retracts the pressure plate from the disc 50.

Figure 2:
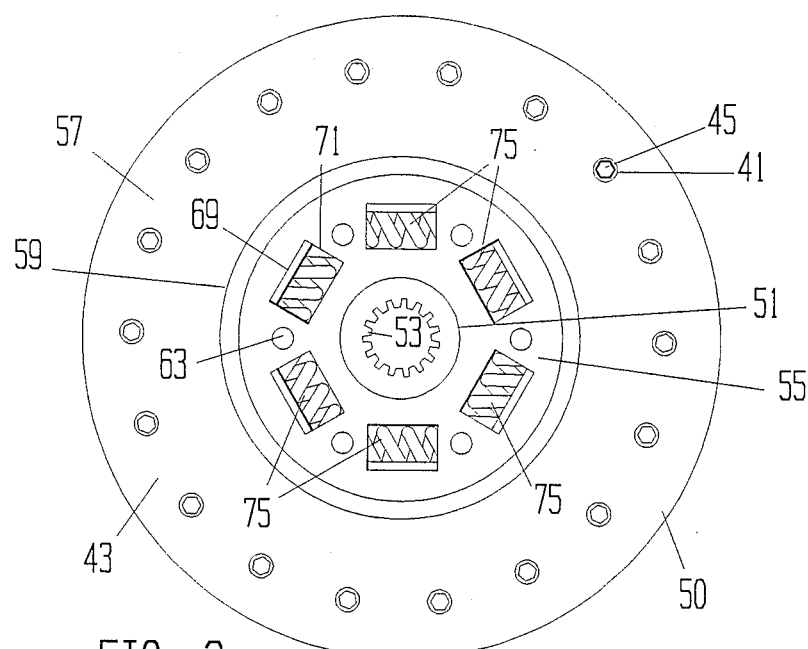
FIG. 2 is a plan view of an improved clutch disc for use in the invention.
Figure 3:
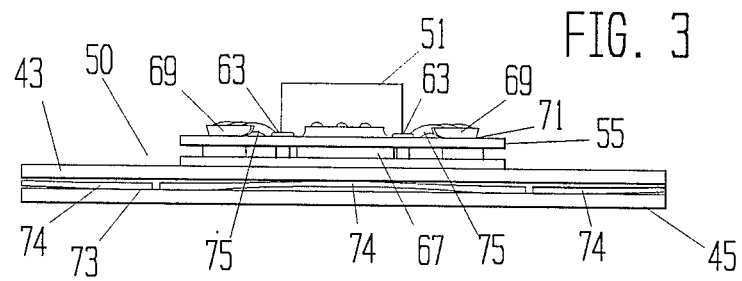
FIG. 3 is an elevational view of the clutch of FIG. 2.

Referring now to FIG. 2, the subassembly of the clutch disc 50 and facings 43 and 45 is shown in an exploded view. The organic composite facing 43 appears in plan view in FIG. 2. The sintered metal facing 45, which is shown in FIG. 3 is on the underside of the disc as it appears in FIG. 2, and it has essentially the same, continuous planar surface as the illustrated organic composite facing 43. The organic composite facing 43 and the sintered metal facing 45 can be provided in any combination in the clutch assembly, either on the flywheel, pressure plate or clutch disc. In the preferred and illustrated embodiment, these two facings are applied to opposite sides of the clutch disc.

Each facing, 43 and 45, is formed as a flat circular disc 57 with a central aperture 59 of sufficient diameter to be received over the central area of the assembly which contains the torsion damper mechanism. Each disc has a plurality of small diameter through apertures 41 which are counterbored to receive conventional rivets 45 which are sunk in the counterbores and which secure the facings to the clutch disc. Alternatively, the facings can also be secured to the opposing face of the clutch disc by other conventional means, such as by bonding with cement, silver solder, welding, etc. Also other mechanical fasteners such as machine screws and the like can be used.

The clutch disc 50 can be any of the various conventional clutch discs, and can include any of the various single or multiple stage torsion damper mechanisms, and any of the various mechanisms for cushion deflection, such as single-segment cushion, double-segment cushion, cushion plate, intermediate plate cushion, etc. Typically, the disc has a hub 51 which has a splined aperture 53 which is received over the end of the transmission shaft (not shown). The hub 51 extends from a hub flange 67 which has a cover plate 55 with a plurality of spacer bolts (or rivets) 63 to retain the hub assembly. The hub flange and cover plate have a plurality of aligned slots 71 which receive compression coit springs 75. Upwardly folded flanges 69 extend along each slot 71 and serve as spring retainers. The springs 75 are also received in aligned apertures in the clutch plate, or segments, depending on the clutch design. This provides a resilient mechanical link between the hub 51 and the clutch plate.

The clutch is illustrated in FIG. 3 with a single-segment cushion structure, in which the facings 43 and 45 are riveted to a segmented plate 73 with a plurality of segments 74 which are formed with a slight convolution, thereby providing resiliency to axial loading and compression.

The sintered metal facing 45 can be formed integrally of sintered metal using conventional powdered metal technology. Common materials for the sintered metal facing can be bronze, aluminum alloys, steel alloys, etc. In most conventional automotive applications, the clutch disc has a diameter from about 6 to about 12 inches. Typically, the segments which form the clutch disc are from about 1/16 to about ⅜ inch thickness, and the frictional surfaces have adequate thickness, usually from ⅛ to about ⅜ inch, to provide adequate life.

The organic composite facing 43 is commonly formed as a circular disc having a thickness typically from about ⅛ to about ¼ inch and is formed of carbon, graphite, or thermosetting organic resins such as polyamides, urea formaldehyde, polyimides, polysulfides, etc. and are usually reinforced with fibrous materials such as chopped fiberglass, graphite fibers and the like. A facing material which can also be used is available under the designation: Carbon-Carbon, from HITCO, Gardena, California. This facing has a very high density carbon, with excellent wear and frictional properties. It has a porous carbon structure, and has not generally been used in automotive applications because this service is too severe. It is desirable, however, as it reduces the inertia on the clutch disc and thus, reduces the wear on the transmission. It can be used as the organic composite facing in this invention, as the sintered metal facing substantially reduces the severity of the wear which is normally experienced when only organic composite facings are used.

Figure 4:
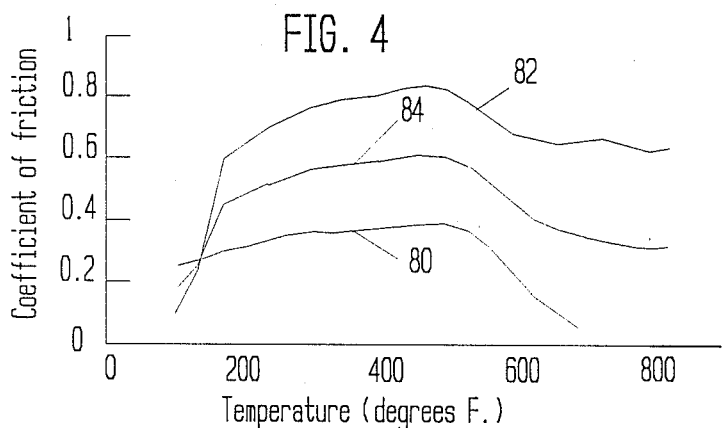
FIG. 4 is a graph illustrating the coefficients of friction of organic composite and sintered metal facings as a function of temperature.

FIG. 4 illustrates the temperature effects on the coefficients of friction of a typical organic composite facing shown by curve 80 and of a typical sintered metal facing shown by curve 82. These curves were derived from the manufacturers'technical performance data for the facings.

The coefficient of friction of the organic composite facing increases slightly from a value of about 0.25 at ambient temperature to a high value of about 0.37 at 500 degrees F., and then rapidly declines at temperatures in excess of 500 degrees F. The coefficient of friction of the sintered metal facing (curve 82) is low at ambient temperature, about 0.1. It rapidly increases as the temperature rises to 200 degrees F. and then slowly continues to rise with increasing temperature, reaching a maximum value of about 0.83 at about 500 degrees F. Although the coefficient of friction declines slightly above 500 degrees F., the rate of decline is slight, and the value of the coefficient remains consistently high at temperatures up to 900 degrees F., and greater.

The average coefficient of friction for both facings is shown by the curve 84. It follows the contour of the sintered metal facing 82.

Figure 5:
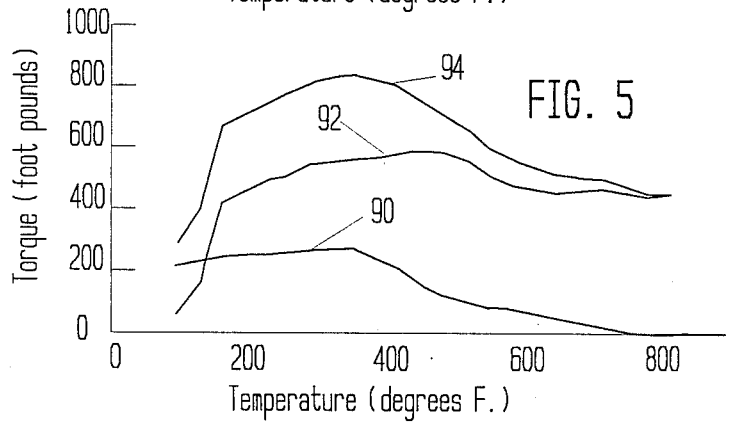
FIG. 5 is a graph of the torque transmitted by the organic composite and sintered metal facings, separately and jointly, as a function of temperature.

FIG. 5 illustrates the torgue transmitted through a typical clutch having facings with an outside diameter of 11.4 inches, and inside diameter of 6.5 inches and with a pressure force of 2000 pounds. Curve 90 illustrates the torque transmitted by the clutch with only organic composite facings, curve 92 illustrates the transmitted torque with only sintered metal facings, and curve 94 illustrates the torque transmitted with both organic composite and sintered metal facings. From these curves, it is apparent that the combined organic composite and sintered metal facings provides superior performance, as the transmitted torque for the combination is significantly greater than for either facing, used alone. The superiority of the combined facings over the sintered metal facings at the low temperature range is readily apparent, for the combined facings transmit much greater torque at temperatures from ambient to about 450 degrees F., and only above 500 degrees F. does the curve for transmitted torque of the combination (line 94) converge on that for the sintered metal facings, along (line 92). It is also readily apparent that the organic composite facings begin to fail at temperatures of 400 degrees F.

The organic composite facing provides smoothness in shifting and avoids the vibration and chattering which is characteristic of the sintered metal facing at low temperatures, while the sintered metal facing provides high temperature service, insuring that the clutch performance does not deteriorate as the service temperature increase.

The combination of a sintered metal facing and a organic composite facing was installed in a 1986 Chevrolet S-10 short bed truck having a 2.5 liter displacement, four cylinder engine. The clutch was the standard original equipment of the vehicle with a clutch disc outside diameter of 9.125 inches and a pressure plate force of 1100 pounds. The metal facing was applied on the flywheel side and the organic composite facing was applied on the pressure plate side of the clutch disc. The clutch performed smoothly without any chatter or vibration. After 3000 miles, the clutch was disassembled and inspected, and it was observed that only minimal wear had occurred as there was no measurable decrease in the thicknesses of the facings and the lathe machining marks were still visible on the pressure plate. Similar observations were made when the combination of the sintered metal and organic composite facings were installed on a 1984 Toyota Celica ST with a 2389 cubic centimeter displacement engine and the manufacturer's standard clutch having a 225 millimeter outside diameter clutch disc with a pressure plate force of 945 pounds. The clutch fitted with the facings in accordance with this invention performed smoothly with no vibration or chattering.

When sintered metal facings are applied to both sides of the clutch discs of the above-identified vehicles, the clutches chatter and vibrate, and the clutch operation becomes uncontrollable.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A clutch plate assembly wherein a clutch disc having first and second planar faces is clamped between a flywheel and a pressure plate, each having a respective face contiguous to and opposing one of said first and second planar faces of said clutch disc to rotationally secure said clutch disc between said flywheel and pressure plate, whereby said clutch assembly moves as a single assembly, the improvement comprising:
   a. an organic composite, frictional facing and no sintered metal facing on a first side of said clutch disc; and
   b. a sintered metal frictional facing and no organic composite frictional facing on the other side of said clutch disc.

2. The frictional plate assembly of claim 1 wherein said assembly is in a clutch mechanism having spring means to bias said outer plates together with said center plate secured in compression therebetween.

3. The frictional plate assembly of claim 2 wherein said clutch disc has a center hub with a splined aperture to be received over a transmission shaft of said motor vehicle.

4. The frictional plate assembly of claim 3 wherein said organic composite, frictional facing has a coefficient of friction which decrease at temperature above 500 degrees F.

5. The frictional plate assembly of claim 4 wherein said sintered metal frictional facing has a coefficient of friction which increases to a maximum value at about 500 degrees F. and remains substantially constant at more elevated temperatures.

6. A frictional clutch assembly of a clutch disc received between a pair of first and second plate members with the plate surfaces of each of said first and second plate members opposed to the contiguous plate surfaces of the clutch disc, and including compression means positioned in said assembly to compress said plates together and against said clutch disc, wherein said opposed surfaces of said plates and contiguous faces of said clutch disc are placed in frictional contact thereby providing a first set of surfaces of a surface of a first plate and a respective contiguous face of said clutch disc and a second set of surfaces of a surface of a second plate and a respective contiguous and opposite face of said clutch disc, the improvement which comprises a frictional facings of an organic composite material and no sintered metal material on said first set of surfaces and frictional facings of a sintered metal material and no organic composite material on said second set of surfaces.

7. The frictional clutch assembly of claim 6 wherein said clutch disc has having a center hub with a splined aperture to be received over a shaft.

8. The frictional plate assembly of claim 6 wherein said frictional facings of said organic composite material have coefficients of friction which decrease at temperatures above 500 degrees F.

9. The frictional plate assembly of claim 8 wherein said frictional facings of said sintered metal material have coefficients of friction which increase to a maximum value at about 500 degrees F. and remain subatantially constant at more elevated temperatures.

* * * * *